(12) United States Patent
Haake

(10) Patent No.: US 6,302,593 B1
(45) Date of Patent: Oct. 16, 2001

(54) FIBER OPTIC CONNECTOR WITH MICRO-ALIGNABLE LENSES AND ASSOCIATED FABRICATION METHOD

(75) Inventor: John M. Haake, St. Charles, MO (US)

(73) Assignee: McDonnell Douglas Corporation, St. Louis, MO (US)

( * ) Notice: Subject to any disclaimer, the term of this patent is extended or adjusted under 35 U.S.C. 154(b) by 0 days.

(21) Appl. No.: 09/223,029

(22) Filed: Dec. 30, 1998

(51) Int. Cl.$^7$ ..................................................... G02B 6/38
(52) U.S. Cl. .............................. 385/74; 385/53; 385/57; 385/67; 385/68
(58) Field of Search ................. 385/50, 52, 53, 385/57, 60, 67, 68, 74, 82, 16; 310/307

(56) References Cited

U.S. PATENT DOCUMENTS

| | | | |
|---|---|---|---|
| 5,080,458 | 1/1992 | Hockaday | 385/14 |
| 5,239,599 | * 8/1993 | Harman | 385/16 |
| 5,553,183 | 9/1996 | Bechamps | 385/95 |
| 5,602,955 | 2/1997 | Haake | 385/136 |
| 5,606,635 | 2/1997 | Haake | 385/53 |
| 5,692,086 | 11/1997 | Beranek et al. | 385/94 |
| 5,745,624 | 4/1998 | Chan et al. | 385/91 |
| 5,870,518 | 2/1999 | Haake et al. | 385/90 |
| 5,881,198 | 3/1999 | Haake | 385/136 |
| 5,892,868 | 4/1999 | Peck, Jr. et al. | 385/34 |
| 5,962,949 | * 10/1999 | Dhuler et al. | 310/307 |

OTHER PUBLICATIONS

Dhuler, V. et al., "Microsystems for Three Axis Active Alignment", paper presented at Solid–State Sensor and Actuator Workshop, Hilton Head Island, South Carolina, Jun. 8–11, 1998, pp. 277–280.

"MEMS Active Fiber Microactuator", Semiconductor International, Dec. 1997, p. 32

* cited by examiner

Primary Examiner—Frank G. Font
Assistant Examiner—Sang H. Nguyen
(74) Attorney, Agent, or Firm—Westerlund & Powell, P.C.; Raymond H. J. Powell, Jr.; Robert A. Westerlund

(57) ABSTRACT

A fiber optic connector and an associated fabrication method where the connector has a connector housing having a base side, a and pair of sidewalls upstanding from the base side that are spaced apart in relation to each other, and each of the housing sidewalls define at least one aperture through which optical signals can be transmitted into and out of the housing by an input optical fiber and an output optical fiber, respectively, located in fixed positions outside the housing, and a pair of optical lens elements are contained within the housing which collimate optical signals transmitted via the respective optical fibers. The lens elements are precisely aligned with respective optical fibers within submicron tolerances using internally-housed micro-aligners. As a result, the fiber optic connector of the present invention can provide efficient coupling between optical fibers, such as optical fibers in two spliced composite parts. In addition, the lens elements can be controllably positioned via the micro-aligners, alternatively, before the housing is hermetically sealed, or after the housing is hermetically sealed to permit in-the-field implementations.

9 Claims, 6 Drawing Sheets

FIBER OPTIC CONNECTOR WITH MICRO-ALIGNABLE LENSES AND ASSOCIATED FABRICATION METHOD

GOVERNMENT RIGHTS

This invention was made under U.S. Army Research Office government contract no. DAAH04-95-C-0007. The government may have certain rights to this invention.

FIELD OF THE INVENTION

The present invention relates generally to fiber optic connectors and associated fabrication methods and, more particularly, to fiber optic connectors especially useful for making precisely aligned optical connections between embedded optical fibers at a structural splice in a composite structure.

BACKGROUND OF THE INVENTION

Fiber optic connectors are commonly employed to align and to interconnect one or more optical fibers with a variety of optical devices or with other optical fibers. For example, fiber optic connectors can be mounted on end portions of a pair of fiber optic cables, each of which include a number of optical fibers. The optical fibers of the fiber optical cables can, for example, transmit data or control signals between various remote devices, such as sensors or actuators, and a central control computer, such as a flight controller of an aircraft. The fiber optic connectors can then be interconnected such that the optical fibers of a first fiber optic cable are aligned with the optical fibers of a second fiber optic cable.

In order to efficiently transmit signals between optical fibers, the fiber optic connectors must precisely align the individual optical fibers such that the optical signals transmitted therethrough are efficiently coupled from fiber to fiber. Such alignment is particularly essential in connecting single mode optical fibers which generally have a light transmitting core of approximately 2–10 micrometers in diameter and which must be precisely aligned with the light-transmitting core of another single mode optical fiber of similar size in order to efficiently transmit optical signals therethrough.

In order to effectively couple optical signals from fiber to fiber, a fiber optic connector must maintain the precise alignment of the individual optical fibers in a predetermined manner such that the optical fibers will remain aligned as the fiber optic connector is mated with another fiber optic connector or with other types of optical device. Therefore, a variety of methods have been developed to align individual optical fibers prior to sealing the optical fibers within the fiber optic connector.

For instance, U.S. Pat. No. 5,606,635 teaches an improved fiber optic connector and associated fabrication method which includes a substrate and at least one microactuator mounted on the substrate and at least one microactuator mounted on the substrate and adapted for relative movement therewith such that an optical fiber which is mounted to the microactuator can be precisely aligned. By precisely positioning the optical fibers, such as with respective lens elements (viz., graded index lens elements), the fiber optic connector of the '635 patent efficiently couples the aligned optical fibers, such as single mode optical fibers, with other optical devices, including other optical fibers. Additionally, the microactuator used in the fiber optic connector described in the '635 patent is controllably positioned relative to the substrate so as to precisely align the optical fiber mounted thereto after the connector housing has been hermetically sealed so as to further enhance the precision with which the optical fibers can be aligned. The positioning means described in the '635 patent for the microactuators is a bimorphic actuator formed of two different materials that respond differently to electrical stimuli such that a deflection created in the bimorphic actuator by electrical stimuli can be used to controllably position a carrier body to which an optical fiber is fixed. Two or three bimorphic actuators are described as usable in the '635 patent such that the carrier holding the optical fiber can be controllably positioned in first, second or third orthogonal directions.

While the fiber optic connector of U.S. Pat. No. 5,606,635 provides a significant improvement over previous active fiber micro-aligner actuator technologies, further improvements are nonetheless desired in the fiber optic connector field. For example, fiber optic circuits and sensors that are embedded in composite structures, such as fiber-reinforced plastics (e.g., a cured prepreg of carbon fiber reinforced epoxy) are desirable over other types of sensors, e.g., surface attached-optical fibers or metallic wires or strain gages, for a number of reasons. Namely, embedded fiber optic circuits and sensors have many benefits over alternative types of sensors, such as well-tolerating the composite manufacturing process; they do not degrade the composite strength; they are EMI and EMP insensitive; they are non-magnetic and are transparent to radar; they provide increased sensitivity as compared to conventional strain gauges; the embedded optical sensors are multiplexable and, therefore, require fewer egress points; and they are relatively lightweight.

In implementation, however, the embedded fiber-to-embedded fiber coupling first requires the fiber to be egressed from the composite structure and, secondly, it requires special protection from being sheared off during the manufacturing process. Clean trimmed fiber optics eliminate this vulnerability but must allow for micron tolerances, which are too large. Previously, hand alignment of each individual fiber at the component's edge egress has been used. However, such a manual approach makes it infeasible to correct for tolerance errors in a fielded system.

As can be appreciated, inadequate fiber optic coupling has been a barrier preventing single mode and multimode fiber optic sensors systems from being incorporated into composite structures, i.e., structures having embedded fiber optics. This dilemma is driving the use of alternative sensor technologies and less desirable surface attachment processes. For instance, surface attached optical fibers are vulnerable to damage and cannot measure important strains and temperatures unlike the embedded case.

Therefore, prior to the present invention, a need has existed for an optical connector which is capable of providing optical coupling between two structurally spliced machined composite components in which there are edge egressed embedded single mode fiber optics.

SUMMARY OF THE INVENTION

The invention meets the above needs and overcomes the deficiencies of the prior art by providing an improved fiber optic connector providing precise optical transmission between optical fibers and associated fabrication methods.

In one embodiment, the inventive fiber optic connector has a connector housing including two opposite sidewalls and a base side, and the housing sidewalls define apertures through which optical signals can be transmitted into the housing from an input optical fiber and out of the housing to an output optical fiber, respectively, where the optical fibers are located in fixed positions outside the housing, and the housing contains a pair of optical lens elements that are each micropositionable in three orthogonal directions relative to the associated input and output optical fibers, such that the intervening lens elements can align the optical signals transmitted between the respective input and output optical fibers without the need to physically contact the optical fibers. By precisely optically aligning the lenses with the optical fibers without requiring direct physical contact and proximity, the fiber optic connector of the present invention can efficiently couple the optical signals carried by the input and output optical fibers, such as single mode optical fibers or multimode fiber optic sensors systems, between separate composite structures, i.e., structures having embedded fiber optics. In addition, the micro-aligner also can be controllably positioned so as to permit precise alignments of the lens element after the connector housing containing the lens has been hermetically sealed so as to further enhance the precision with which the optical fibers can be aligned and permit in-the-field implementation. Thus, the micro-aligner can be used to precisely align the plurality of lens elements such that the optical signals transmitted therethrough can be collimated.

One suitable type of micro-aligner that can be used to precisely position the lens elements in the practice of this invention, includes a lens holding means for receiving the lens, in which the held lens is independently movable in any of three orthogonal directions relative to the associated optical fiber. One exemplary micro-aligner useful for accomplishing this function has a carrier upon which the optical lens is held, and the carrier is provided with first and second in-plane (viz., x-axis and y-axis) microactuators for inducing in-plane movement of the carrier and held optical fiber in respective first and second orthogonal directions along the surface plane of the carrier, and a third microactuator for inducing out-of-plane (viz., z-axis) movement of the carrier and held optical fiber in a third direction that is orthogonal to said first and second orthogonal directions. The carrier is positioned within a recess of a stationary alignment housing as defined by a base and upright sidewalls. The carrier includes first and second biasing means biased against sidewalls of the stationary alignment housing to thereby impose counter forces against which the respective first and second in-plane microactuators on the carrier must act and overcome (as well as the stiction/friction associated with moving the carrier across the surface of the base, the forces associated with the wire bonds and all other forces typically encountered in aligning and bonding optical fibers) to induce in-plane movement of the carrier relative to the optical device. Backstops are provided on the carrier to limit the return movement of the in-plane microactuators. When the first and second (in-plane) microactuators are at rest, the counterforce biasing means establish an equilibrium in-plane reference position of the unitary movable carrier in a corner of alignment housing. This three-axes active lens micro-aligner enables the precise alignment of the optical signals being transmitted between the optical lenses. This three axes active micro-aligner as used in the fiber optic connector enables the precise alignment of an optical lens with another optical lens located in the connector housing.

In one advantageous embodiment, the inventive fiber optic connector is used for optical coupling of optical fibers in two spliced composite parts. For instance, the inventive connector can be used to couple an array of embedded edge trimmed single mode fiber optics in the primary structure to an array of single mode fiber optics in an attached substructure. More specifically, the inventive fiber optic connector is capable of providing optical coupling between two structurally spliced machined composite components in which there are edge egressed embedded single mode fiber optics. The inventive fiber optic connector permits rapid mating of component edges, allowing the rapid misalignment to be eliminated by the micro-aligners located inside the connector housing. The inventive fiber optic connector enables affordable optical connection with sub-micron alignment tolerances to be made after the embedded fiber optics are machined off at the egress point during a standard composite trimming process.

This invention makes also it possible to fabricate modular, composite structures that have integrated microelectronics devices and circuitry. The modularity permits the fabrication of a common primary structure and then using the quick release connectors and interchangeable devices tailor the structure to meet any unique mission objectives.

Also, this invention permits the use of embedded fiber optic sensors and signal conduits in fieldable systems. The fiber optic connector of the present invention makes correction for tolerance errors possible for a fielded system.

The present invention will now be described more fully hereinafter with reference to the accompanying drawings, in which a preferred embodiment of the invention is shown. Like numbers refer to like elements throughout.

BRIEF DESCRIPTION OF THE DRAWINGS

Corresponding reference characters indicate corresponding parts throughout the drawings. The drawings should not be construed as necessarily being drawn to scale.

DETAILED DESCRIPTION OF THE PREFERRED EMBODIMENTS

Figure 1:
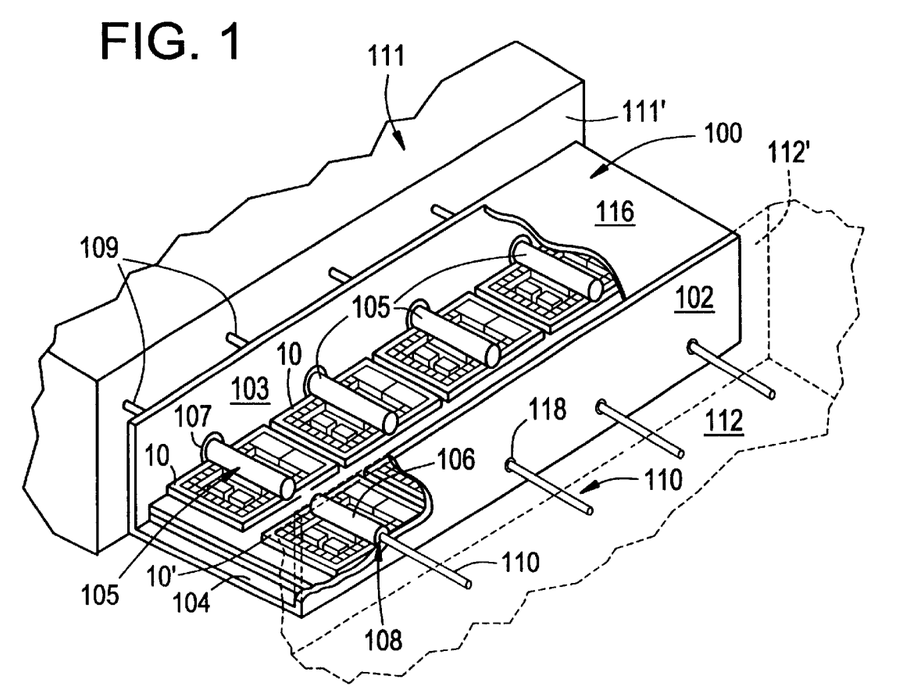
FIG. 1 is a perspective view of the fiber optic connector of the present invention, and as partially cut-away for the sake of clarity, being used to optically couple optical fibers at the edges of two composite structural parts.

Referring now to the figures, and particularly to FIG. 1, a fiber optic connector 100 has an exterior structure formed as a housing 101 including a base side 104 and opposite sidewalls 102 and 103 upstanding from the base side 104. While the connector housing 101 can be comprised of a variety of materials, the connector housing of one embodiment is comprised of metal, such as stainless steel, and, in a more specific embodiment, is comprised of KOVAR™ brand stainless steel. Preferably, the housing 101 is comprised of a material which has a coefficient of thermal expansion which closely matches the coefficient of thermal expansion of the window elements 107 and 108.

Fiber optics have been pre-embedded in composite structures 111 and 112 bordering the fiber optic connector 100 for which optical coupling will be effected. The sidewalls 102 and 103 of the connector housing 101 also define apertures into which hermetically sealed windows 107 and 108, respectively, are pre-installed, which permit optical signal transmission between the exposed input optical fiber 109 extending from the edge surface 111' of first composite structure 111 into the interior of the housing 101 and from the interior of the housing 101 back out to exposed output fiber 110 extending into edge surface 112' of second composite structure 112. As appreciated, FIG. 1 only shows edge portions of the composite structures 111 and 112 as the rest of the structures thereof do not interact directly with the fiber optic connector 100 of interest.

The connector 100 is adhesively attached to the composite structures 111 and 112 prior to executing alignment of the lenses 105 and 106. The input optical fiber 109 and an output optical fiber 110 have exposed terminal ends 109' and 110' (see FIG. 2), respectively, that are brought into close proximity with the respective windows 107 and 108, and then they are fixed in position in relation to the windows of housing 101 by use of conventional epoxies or solders used for opto-electronic packaging or the same type of resin that is used in the composite structure. The optical fibers, both input and output, preferably are individually aligned with a respective aperture/window defined in the adjoining sidewall of the connector housing 101. While FIG. 1 illustrates four input optical fibers to be aligned with four output optical fibers via the fiber optic connector 100, it will be appreciated that the invention is applicable to the coupling of a single pair of fibers or any plural number of fiber pairs within practical reason.

A pair of refractive lens elements 105 and 106 are disposed within the housing 101 in a co-axial orientation to each other (and the windows 107, 108 and fibers 109 and 110). The lenses 105 and 106 collimate optical signals transmitted via the respective optical fibers 109 and 110. The lens elements 105 and 106 have inner end portions 105' and 106' respectively (see FIG. 2) facing each other in spaced apart relation across air gap "a", and outer end portions 105" and 106" (see FIG. 2), respectively, facing a respective end of one of the optical fibers 109 and 110. The lens elements 105 and 106 are held by micro-aligners 10 and 10' within the housing 101. The micro-aligners 10 and 10' are positioned within the connector housing 101 such that the lenses 105 and 106, as initially cradled on the micro-aligners, are generally aligned up about a common longitudinal axis 117 and only micro-alignments are needed to be induced by the micro-aligners to achieve maximum optical coupling. The lenses 105 and 106 are positionable in three orthogonal directions relative to one of the input and output optical fibers 109 and 110 by operation of the micro-aligners, which is described in greater detail below. That is, the fiber optic connector 100 of the present invention includes a base side or substrate 104, such as a metallic, or a ceramic or a silicon substrate, and at least one micro-aligner 10 and micro-aligner 10' is mounted on the base side 104 for each lens element 105 and 105, respectively, and adapted for relative movement therewith. A lens element (105, 106) is preferably affixed to each micro-aligner (10, 10') such that relative movement of the micro-aligner (10, 10') will controllably position the respective lens element (105, 106) with respect to a window (107, 108) defined in the sidewall (103, 102) of the connector housing 101, and, with respect to an optical fiber (109, 110) fixed in position to the opposite side (107', 108') of the window (107, 108). In this way, the fiber optic connector 100 of this invention provides independent alignment capability to each of the two lenses 105 and 106, enabling correction of tolerance errors at both the input fiber 109 and output fiber 110. In one preferred embodiment, the lens elements disposed within the connector housing are first and second graded refractive index lenses, such as graded index (GRIN) lens elements.

Figure 2:
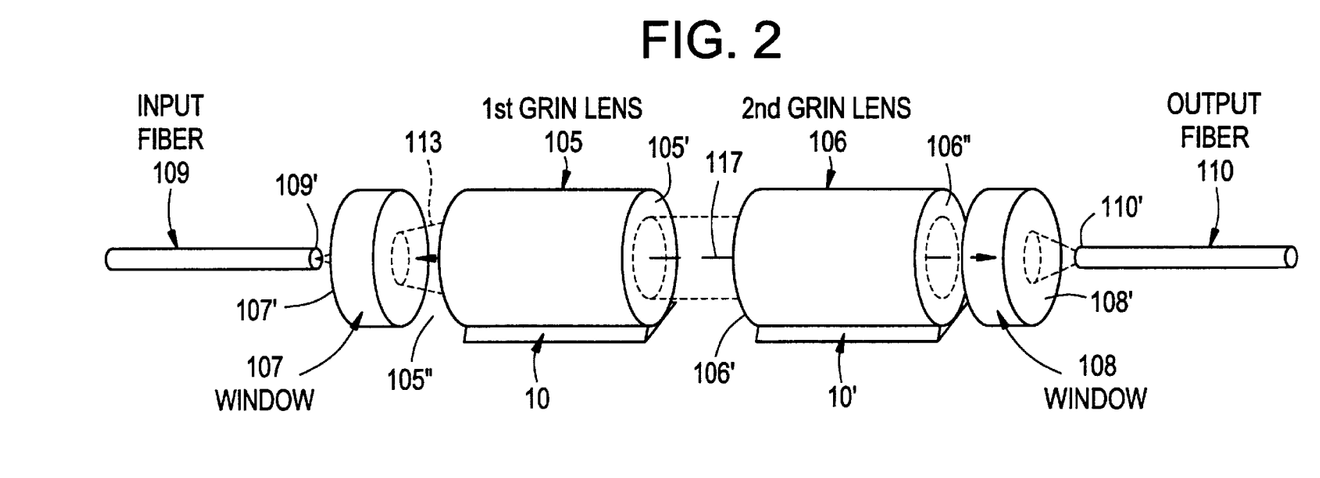
FIG. 2 is a schematic representation of the fiber optic connector shown in FIG. 1 in which only a portion of the respective components of the connector are illustrated for the sake of clarity.

Referring to FIG. 2, an exemplary layout of the optical circuit of the invention is shown where GRIN lenses are used for lenses 105 and 106. Light 113 emanating from the end 109' of input fiber 109 is coupled into the first GRIN lens 105 after passing through connector housing window 107. The GRIN lens 105 collimates the light 113 and propagates it to the second GRIN lens 106. This second lens 106 focuses the light 113 onto the end 110' of the output fiber 110 after passing through the opposite sidewall housing window 108, thus completing the optical circuit. The windows 107 and 108, through which the optic signal input/output enters and departs, respectively, from a connector housing (see feature 101 in FIG. 1) containing the lenses 105 and 106, serves to hermetically seal the connector housing 101 and reduce the risk of contamination of the fiber ends. The two lenses 105 are moved independently by way of the micro-aligners 10 and 10' to correct for any error in positioning of the fibers 109 and 110, thus providing for optimal coupling. Micro-aligners 10 and 10' have the same design for purposes of this invention, and only differ as to their position within the housing and thus the lens to which they are respectively dedicated. Therefore, insofar as to design and construction, a reference herein to micro-aligner 10 will be understood to be equally applicable to micro-aligner 10'. Also, while FIG. 2 shows some spacing between the tips 109' and 110' of the optical fibers 109 and 110 and the respective confronted windows 108 and 107 to illustrate the transmission of optical signals therebetween, it will be understood that the tips 109' and 110' are bonded in very close proximity, and preferably flush (i.e., in direct contact), with the facing surfaces 107' and 108' of the windows 107 and 108, respectively, in the practice of this invention. The bond can be effected such as by using a transparent epoxy resin (118 in FIG. 1) of a conventional nature to opto-electronic packaging.

Figure 3:
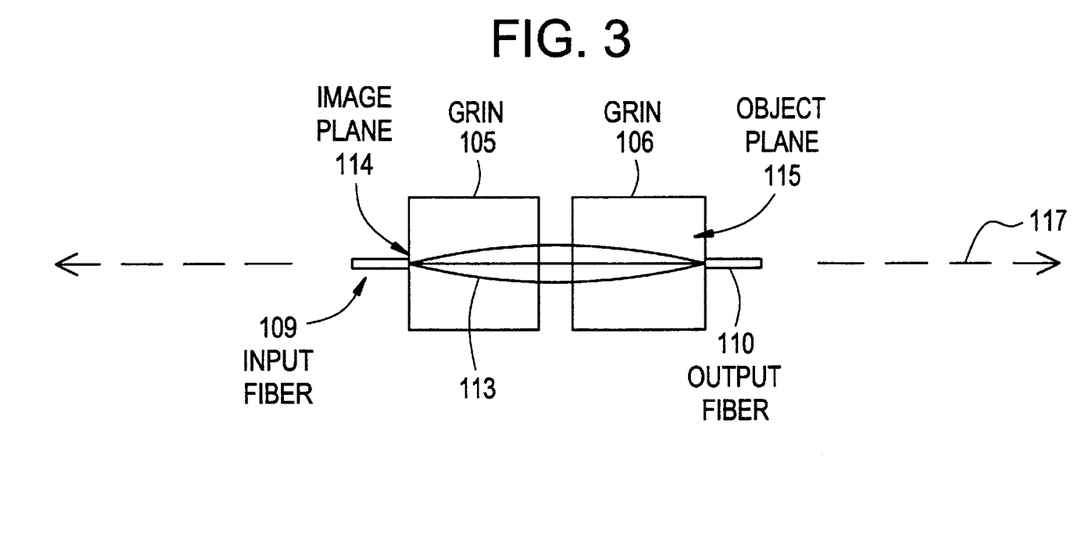
FIG. 3 is a schematic representation of the optical relationship of the optical fibers being coupled and the GRIN lens components of the fiber optic connector shown in FIG. 1.

Referring to FIG. 3, the optical circuit of the inventive connector is schematically illustrated including indications of the image plane 114 of the GRIN lens 105 associated with input fiber 109 and the object plane 115 of GRIN lens 106 associated with output fiber 110. This conceptual approach of FIG. 3 assumes the fibers 109 and 110 mate flush to a GRIN lens at each end of the connector 100. The first lens, GRIN 105, collimates light from the input fiber 109, and transfers it to GRIN 106, which is used to refocus it back into the mating fiber optic 110. The connector 100 (see FIG. 1) moves the GRIN lenses 105 and 106 independently of one another to thereby enable the scanning of each of the surfaces of the composite structures in which the edge egressed fiber optics are embedded. These surfaces form the focal planes 114 and 115 for each end of connector 100. The GRIN lenses 105 and 106 are moved to their optimal positions for efficient optical coupling.

The lenses 105 and 106 can be aligned with the optical fibers 109 and 110 either prior to or following the hermetic sealing of the connector housing 101. The hermetic sealing of the housing 101 can be accomplished by affixing a cover plate thereto by conventional methods. In embodiments in which the optical lenses 105, 106 are aligned prior to sealing the connector housing 101, such as during manufacturing, the lenses can be aligned with respect to the respective optical fibers 109, 110 as described above, and, thereafter, the connector housing 101 can be sealed. For example, a lid 116 can be secured, such as by seam sealing, to the connector housing 101 following alignment of the lenses 105, 106. In addition, the positions of the lenses 105 and 106, as supported upon microaligners 10 and 10', respectively, can be fixed prior to sealing the connector housing 101, such as by activating a radiation-curable adhesive, such as an ultraviolet light-curable adhesive, mutually in contact with both an alignment frame (feature 17 in FIG. 4A, and described in detail below) of a micro-aligner 10 (or 10') and the underlying fiber optic connector base side 104. The connector housing 101 can include a transparent window through which a laser or other appropriate light source can be directed so as to activate the adhesive or solder and bond the alignment frame of the micro-aligner 10 (or 10') to the base side 104. Alternatively, the hermetically sealed connector housing 101 can include an additional lead which is electrically connected to the base side 104 in the vicinity of the heat-activatable adhesive such that the adhesive can be resistively heated and the alignment frame of the micro-aligner 10 (or 10') can be thereby be bonded to the base side 104.

Alternatively, in embodiments in which the lenses 105, 106 are aligned after hermetically sealing the connector housing 101, the fiber optic connector 100 can also include a plurality of electrical pins (not shown) extending through the rear surface of the connector housing 101 to provide electrical access to each of the microactuators (i.e., features 15, 16 and 19 of FIG. 4A, discussed in greater detail below) of the micro-aligner 10. In particular, electrical leads can interconnect the pins with respective ones of the x-, y-, and z-axis microactuators, and, more particularly, with bonding pads disposed on the opposed end portions of each microactuator. Accordingly, by applying appropriate electrical stimuli to predetermined ones of the electrical pins, each optical lens 105, 106 can be individually positioned in first, second, and third orthogonal directions relative to the respective optical fiber 109 or 110 after the connector housing 101 has been hermetically sealed.

By transmitting predetermined optical signals through the optical circuit of the fibers 109, 110 and lens elements 105, 106 and detecting the optical signal output received at an optical fiber, such as by using techniques and equipment as described in U.S. Pat. No. 5,745,624, which teachings are incorporated herein by reference, the relative alignment of each optical fiber with its respective lens element can be determined.

In mounting the micro-aligner 10 and 10' directly to the base side 104 of the connector 100, or alternatively to an intervening stationary support premounted on the base side, the alignment frames (feature 17 in FIG. 4A) of micro-aligners 10 and 10' can be bonded to the base side 104 of the housing 101 by employing an adhesive mutually in contact with both the alignment frame and the base side in the manner described above.

Composite structures 111 and 112 in FIG. 1 can be a conventional organic carbon composite structure fabricated with standard techniques, e.g., lay-up or fiber placement. Embedding an optical electrical flexcircuit simultaneously embeds the fiber optic (109, 110) and electrical conduit in the structure during the manufacturing process. The connector region shown in FIG. 1 is machined off and optically polished using standard polishing techniques suitable for optical surfaces. The fiber optic connector 100 is attached to the primary structure 111 making electrical connection to the power bus (not shown) and completing the electrical circuit for the remaining structure 112. The secondary structure 112 is keyed and attached to the primary structure 111. The fiber optic connector 100 is subsequently powered and the optical circuit is completed.

Figure 4A:
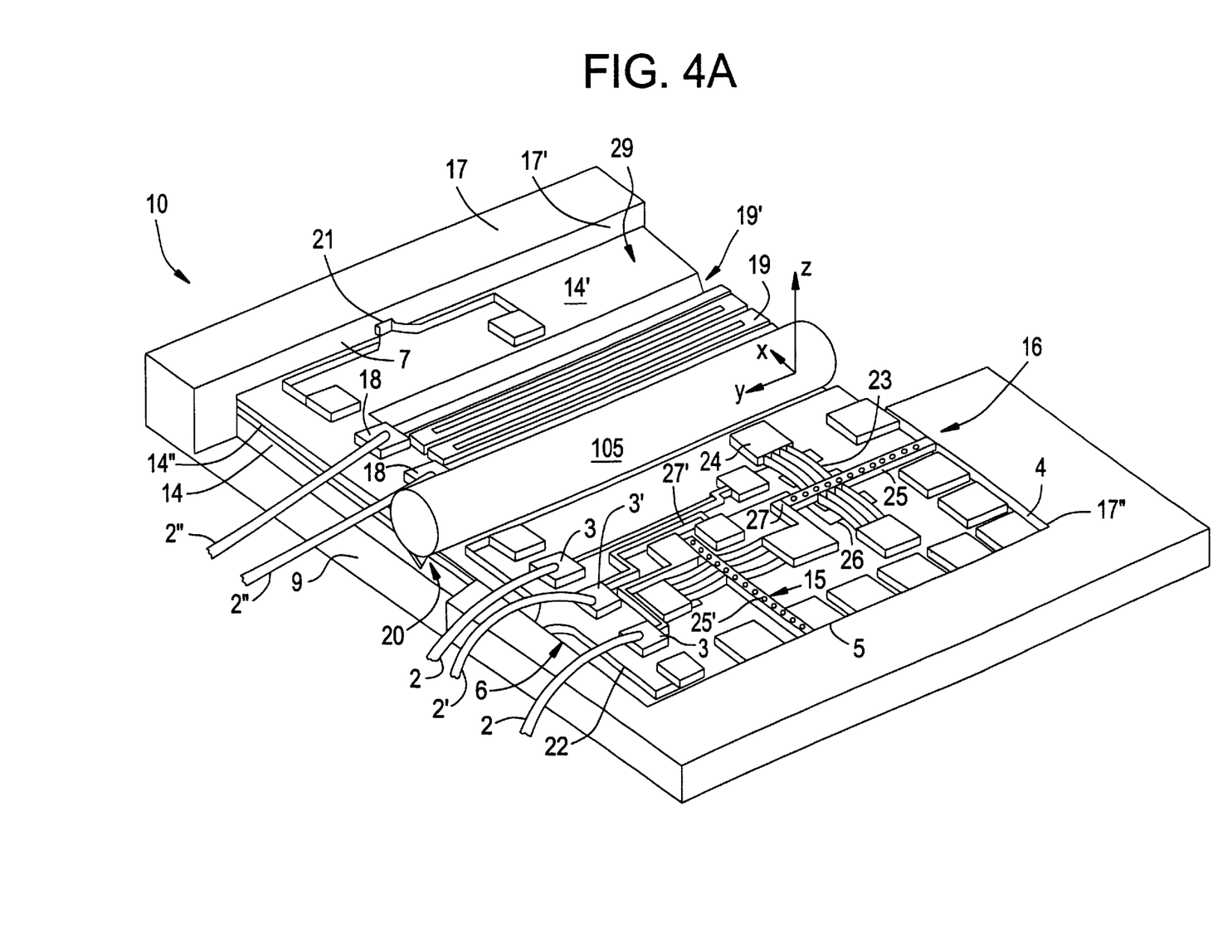
FIG. 4A is an enlarged perspective view of a micro-aligner used inside the connector housing in accordance with one embodiment of the invention.

Referring to FIG. 4A, a preferred micro-aligner device 10 for use in this invention for providing independently controllable micro-positioning of a lens element 105 is shown in more detail. The micro-aligner 10 controllably positions lens element 105 held and supported therein to precisely align it with an input optical fiber 109 located fixed in position outside window 107 of the connector housing as described above (see FIGS. 1, 3). The micro-aligner 10 controllably positions the lens 105 to precisely align it with an associated optical fiber. The optical fiber 109 (FIG. 1) may be a single mode, multi-mode or polarization preserving optical fiber. In addition, the optical fibers may have a lensed facet or a cleaved end facet without deviating from the scope of the invention.

As will be understood, the construction and operation described in connection with micro-aligner 10 and lens element 105 with reference to FIG. 4A is equally applicable to the arrangement of micro-aligner 10' and lens element 106. And, the manner of aligning lens element 106 with output optical fiber 110 using micro-aligner 10' will be the same as that described in detail herein for micro-aligner 10 as used to align lens element 105 with input optical fiber 109.

A micro-aligner (10, 10') must include a lens holding and supporting means for receiving a lens, and the micro-aligner must be able to manipulate the held lens independently in any of three orthogonal directions (i.e., x-, y-, and z-axis directions) relative to the associated optical fiber (located outside the connector housing) within precise submicron tolerances, preferably within about 1.0 $\mu$m or less. The micro-aligner 10 must be small enough to easily fit within the housing enclosure 101, which housing can involve sizes of approximately 5×4×1 mm$^3$, while still being large enough to controllably support a lens and be robust and durable to tolerate in-the-field utilizations and handling and the like.

As shown in FIG. 4A, micro-aligner 10 has a carrier substrate 14 upon which its various components are fabricated. The lens 105 is precisely attached in an optical groove 20 formed in carrier 14. The carrier substrate is a unitary body, and it rests on a base 9 of an alignment housing 17.

The alignment housing 17 of the micro-aligner 10 is a frame-like body disposed in fixed relation to optical fiber 109. The lens 105 can have a major length that is entirely supported by the groove 20, or alternatively, a major portion of the length of the lens 105 can be supported by groove 20 with ends of the lens 105 hanging over the side edges of the frame 17 (room permitting inside the housing 101). For example, the alignment housing 17 includes sidewalls 17' upstanding from base 9 along four sides and can include openings sidewalls on two opposing sides of the alignment housing 17 to accommodate positioning of a lens 105 in groove 20 where the lens has some portion of its longitudinal length extending off the carrier 14, if desired. The size of the recess formed by the sidewalls 17' is selected to slightly exceed the dimensions of the carrier 14 while being close enough to permit spring biasing to be created between the sidewalls of the alignment support structure and the carrier, as will be described in greater detail below. In a preferred embodiment, the alignment housing will include four upright sidewalls 4, 5, 6, and 7 arranged on base 9 such that a pair of parallel sidewalls is provided normal to each of the x-direction (i.e., walls 5, 7) and the y-direction (i.e., walls 4, 6) that together with base 9 define a recess 29 therein that will receive carrier 14 for reasons that will become apparent from the following descriptions.

The alignment housing 17 is preferably formed of a thermally conductive material to serve as a heat sink. In addition, the alignment support structure can also draw heat from the underside of the carrier 14. By drawing heat from the carrier, the lens 105 can be maintained at a predetermined constant temperature such that the alignment of the lens 105 is not altered or otherwise affected due to temperature fluctuations. In one exemplary embodiment, the alignment support structure is comprised of a metallic material, such as copper or nickel. The alignment support structure can be a micromachined cavity or box formed by a variety of processes, such as by LIGA processing methods for making alignment structures, such as those described in U.S. Pat. No. 5,602,955, which teachings are incorporated herein by reference. In this way, the alignment housing 17 has the sidewalls 17' and base 9 formed as an integral body.

The carrier 14 sits on the base 9 of the alignment housing structure 17 by virtue of gravity and springs 21,22 and which act to hold it in the housing recess 29, and it is not bonded or otherwise attached thereto. Thus, carrier 14 is freely slidable over base 9 once any inter-frictional forces therebetween are overcome. In one preferred embodiment, substrate 14 comprises a layer of polished silicon. Other semiconductor materials that can be micromachined are also usable for substrate 14. The side length dimensions and thickness of carrier 14 can be relatively small, for example, the side dimensions each can be less than or equal to 5 mm and thickness can be approximately 0.5 mm.

It is to be understood that groove 20 can be formed by a variety of processes, such as etching, and may have a variety of other cross-sectional shapes without deviating from the scope of the invention. For instance, channel 20 can be a groove having a v-shaped cross section with opposing side walls defining an angle of approximately 55° with respect to the top surface 14' of substrate 14, such as a cylindrical optical body-holding groove of the type described in U.S. Pat. No. 5,602,955, which teachings are incorporated herein by reference. For a bulk silicon wafer carrier, this type of groove can be formed by an anisotropic wet etch of the wafer surface with potassium hydroxide, or anisotropic plasma etch, and the like, according to techniques well known in the semiconductor processing arts, such as by anisotropic etching in the carrier substrate 14 in two different directions or orientations, such as <110> and <100>. A groove also can be formed by laser cutting of the wafer surface. Preferably, the V-shaped groove preferably should be made deep and wide enough so that lens 105 is initially positioned (cradled) in the groove slightly below (e.g., approximately 5 μm below) its final predicted aligned position.

Alternatively, in lieu of groove 20, an LIGA channel can be defined in its body for receiving and holding the lens 105 in a fixed relation thereto. An optical bonding agent or solder, for example, could be used to secure lens 105 within an LIGA channel to maintain it in a fixed position relative to carrier 14. For example, a conventional optical glass bonding agent, such as Gould GlasSolder™ bonding agent, or a high temperature fluxless solder, such as gold/tin eutectic alloy solder, can be used to bond lens 105 to carrier substrate 14. As known to those skilled in the art, the surface of lens 105 is preferably metallized with titanium, platinum and gold, for example, which improves the bond within an LIGA channel. Whether holding means 20 is a groove or LIGA channel, carrier substrate 14 constitutes a carrier for holding lens 105 in a fixed relation thereto.

The aforesaid active micro-aligner 10 includes first and second in-plane actuators 15 and 16 for effecting the in-plane alignment in the orthogonal in-plane (x- and y-axes) directions of the lens 105 held by the micro-aligner 10, while a third actuator 19 is used for effecting the out-of-plane (z-axis) alignment of the lens 105 held by the micro-aligner 10. The preferred constructions of the in-plane and out-of-plane microactuators are described in greater detail below.

Referring to FIG. 4A, in order to induce in-plane alignment of lens 105 as held on carrier 14 with an associated optical fiber located outside the connector housing 101, the micro-aligner 10 includes two orthogonally positioned in-plane actuators, including x-direction actuator 15 and y-direction actuator 16, respectively, which are adapted to move carrier 14 relative to stationary alignment housing 17 and the associated optical fiber in respective planar orthogonal x- and y-directions respectively, extending in a plane defined by the surface 14' of substrate 14. In turn, this permits lens 105 to be precisely aligned with an associated optical fiber in the in-plane directions.

In one embodiment, x-direction actuator 15 and y-direction actuator 16 are thermally actuated arch beam actuators. More specifically, and still referring to FIG. 4A, when such a thermally actuated arch beam actuator 16 is activated, its beam 25 moves relative to the stationary alignment housing 17 and its sidewalls 17' and base 9. Beam 25 moves along an orthogonal in-plane direction 16" (see FIG. 5), which is opposite to the y-direction indicated in FIG. 4A, until beam 25 comes into contact with the immediately confronting stationary sidewall 4 among sidewalls 17' of alignment housing 17 and creates an opposing force pushing the carrier 14 away from the sidewall 4 in the y-direction. The other in-plane thermally actuated arch beam microactuator 15 interacts in a similar manner via its beam 25' with another sidewall 5 among sidewalls 17' of the alignment housing 17 to push carrier 14 in an x-direction that is orthogonal to the y-direction.

The counterforce return springs 21 and 22 provide counter biasing forces that the x-direction actuator 15 and y-direction actuator 16 must act against and ultimately overcome, respectively, when activated to impart in-plane movement to carrier 14. Counter force spring 22 is shown in more detail in FIG. 4B, which cut5 away a portion of the alignment housing sidewalls 17' for sake of illustration only. The counterforce springs 21 and 22 are biased against respective stationary walls 6 and 7 of alignment housing 17 to create respective biasing forces pushing the carrier 14 back into reference corner 17" of alignment housing 17 when the in-plane actuators 15 and 16 are both de-activated, and the carrier 14 is held in place as wedged into corner 17" as the equilibrium condition of the micro-aligner 10 until either or both of the in-plane actuators 15 and/or 16 are again activated. More specifically, when either or both are actuated, arch beam actuators 15 and 16 overcome the counter bias force provided by springs 21 and 22, respectively, as well as the frictional forces between carrier 14 and the alignment housing base 9, and the bending moments of the leads 2 connected to pads 3, to move carrier 14 in the desired in-plane direction.

Figure 5:
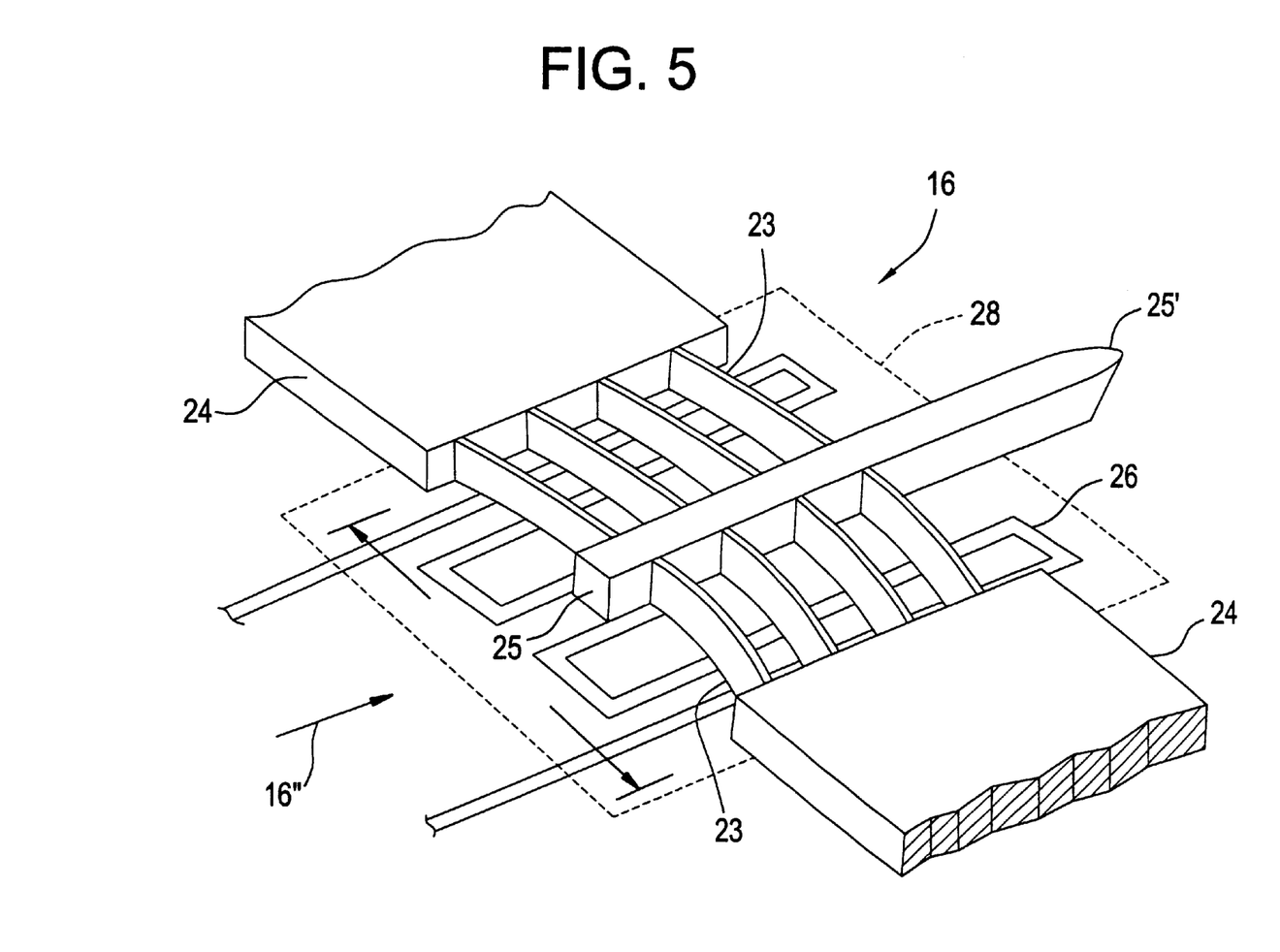
FIG. 5 is a perspective view of a thermal arch beam actuator used as the in-plane (x-axis) actuator in the micro-aligner shown in FIG. 4A.

As illustrated in more detail in FIG. 5 with respect to the y-direction thermally actuated arch beam actuator 16, and as equally applicable to x-direction thermally actuated arch beam actuator 15, the thermally actuated arch beam actuator 16 generally includes a plurality of arches 23 supported between a pair of side support structures or pads 24 and suspended over diaphragm 28 formed in the underlying surface 14' of substrate 14 by undercut etching of the substrate 14. Advantageously, such actuators 16 (and 15) are comprised of a single material so that they are less expensive and less complicated to fabricate than, for example, bimorphic actuators made from two materials. Although FIG. 5 illustrates actuator 16 as having four arches 23, the number of arches 23 may vary (e.g., 2–20). A cantilever beam 25 extends across the arches 23. The cantilever beam 25 has a rounded distal end 25a oriented towards the alignment housing sidewall 4 (or 5).

Figure 4B:
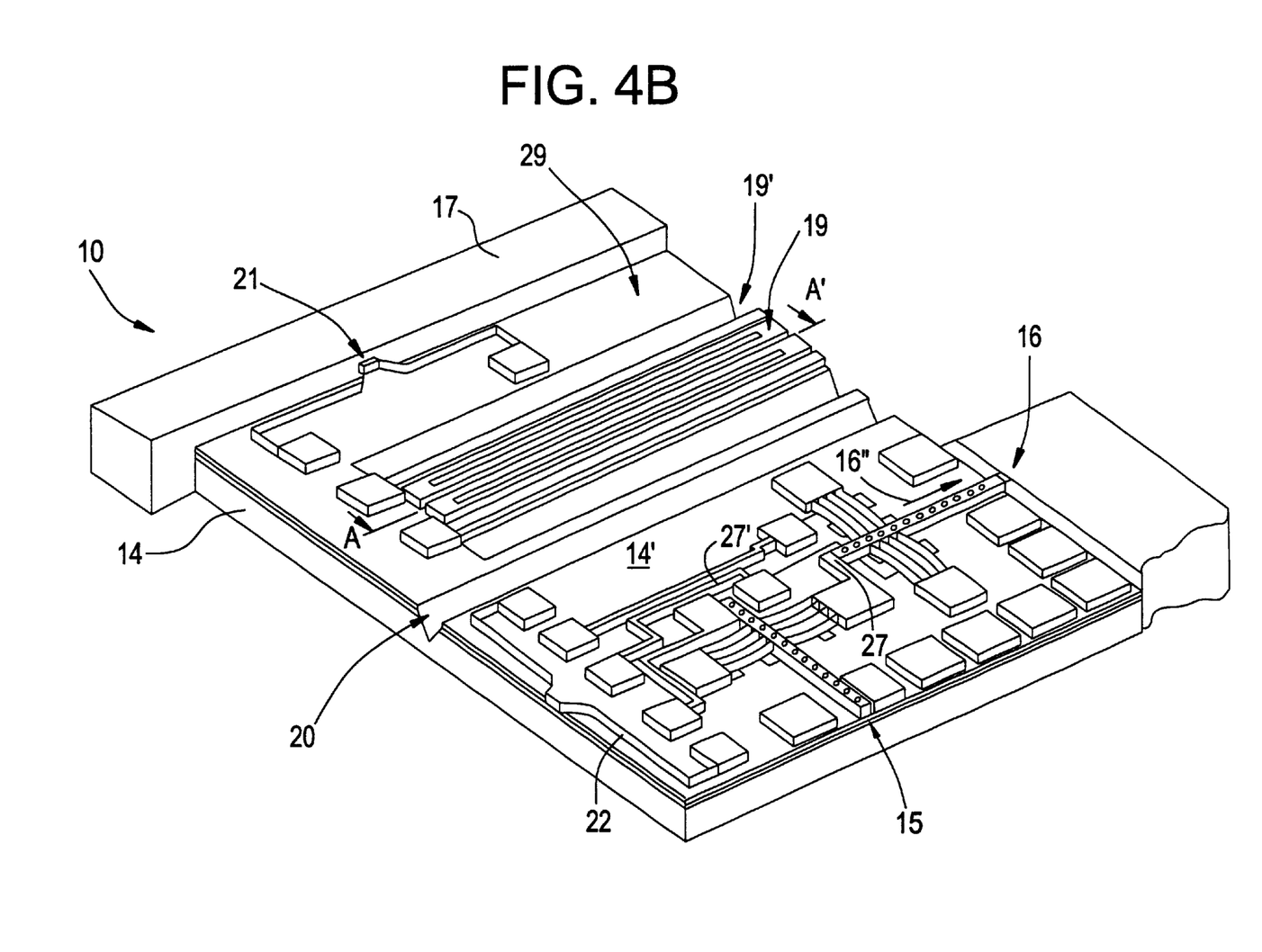
FIG. 4B is another enlarged perspective view of the micro-aligner according to FIG. 4A showing including a cut-away view of a portion of the alignment housing structure thereof and without the lens element illustrated for the sake of clarity.

When heated by a heater 26, thermal expansion causes the arches 23 to bend in a direction determined by their orientation, namely, in the direction 16" indicated in FIG. 5 (and FIG. 4B). As a result of the bending of arches 23, beam 25 moves along direction 16" towards and ultimately against sidewall 4 of the alignment housing 17 (see FIG. 4A). In a preferred embodiment, a polysilicon resistive heater positioned, or located, in close proximity to each actuator 15 or 16 (i.e., directly below the arches 23) embodies the heater 26. Thus, heater 26 provides heat to arches 23 when electrically stimulated for urging beam 25 towards and ultimately against bearing surface 4.

As a result, each beam 25, 25' of the respective thermally actuated arch beam actuators 16, 15, respectively, can be electronically controlled to independently apply a positive force to the carrier 14 effective to overcome the opposite biasing force of the associated retainer springs 21, 22, respectively, causing the carrier 14 to move in the opposite direction to the direction of force being applied by either beam 25, 25' against a sidewalls 4, 5 of the alignment housing 17. This allows for controlled positioning of the carrier 14 relative to the optical device 13 (and the alignment housing base 9) in an in-plane direction. The top surface of base 9 and the bottom surface of carrier 14 are preferably polished which reduces friction between the two features. Alternatively, the bottom surface of movable carrier 14 is coated with TEFLON® in order to reduce frictional forces between the top surface of a base 9 and the bottom surface of carrier 14.

In general, the direction of arches 23 determines the direction in which actuator 16 (or 15) bends, or deflects, and the amount of this movement is a function of the current supplied to polysilicon resistive heater 26. Thus, controlling the current supplied to heater 26 controls the deflection of actuator 16 and, consequently, controls the position of carrier 14 relative to optical device 13. Accordingly, in-plane microactuators 15 and 16 controllably position carrier 14 relative to the input (or output) optical fiber to precisely align the lens 105 in groove 20 (or as bonded to an LIGA channel 20) with the associated optical fiber in the respective x- and y-directions.

As also illustrated in FIG. 4A, micro-aligner 10 has connections or leads 2 to a current supply (not shown) which supplies current to the polysilicon heaters 26 to resistively heat the respective arch beam actuators 15, 16. Return lead 2' is connected to bonding bad 3'. In order to facilitate this electrical stimulation of heaters 26, bonding pads 3 and 3', preferably thin films of a conductive material (e.g., gold), are formed on opposite end portions of the resistive element of each heater 26 for connection to the leads 2 from a current supply. Preferably, the heaters 26 can comprise a resistive element having a serpentine-pattern beneath the arches 23 of each in-plane microactuator 16 (and 15), which heats when energized with current. A cavity is provided by etching the underside of carrier 14 below a portion of each in-plane actuator 15 and 16 to form diaphragm 28 (see FIG. 5) to help thermally isolate heaters 26 from the rest of micro-aligner 10.

As shown in FIG. 4A, for example, backstops 27 and 27' are located on carrier 14 behind both the opposite distal ends (25a, 25b: FIG. 5) of beam 25 and beam 25', respectively, to delimit the amount of return movement of respective beams after distension prevent the arches from buckling when the beam returns.

In another embodiment of this invention, the x-direction actuator 15 and y-direction actuator 16 can be bimorphic actuators, such as the type described in U.S. Pat. No. 5,602,955, which teachings are incorporated herein by reference.

To induce out-of-plane positioning alignment of the lens 105 with the associated input or output optical fiber in a third direction, i.e., the z-axis direction indicated in FIG. 4A, that is orthogonal to the aforesaid two in-plane (x,y) directions, a third microactuator 19 is provided on the carrier 14 which, when activated, effectively deflects the carrier 14 upward in a normal direction away from the direction of the alignment housing base 9. This three-axes active micro-aligner 10 enables the precise alignment of a lens with an input or output optical fiber located off the carrier without needing physical contact of the optical fibers to be coupled.

Preferably, the z-direction actuator 19 is a bimorphic-type actuator formed on the carrier 14. Advantageously, the bimorphic actuator 19 is adapted to controllably position carrier 14 in the z-direction relative to the base 9 of the alignment housing 17 and the respective input or output optical fiber. In general, layers of two materials which respond differently to thermal stimulation embody bimorphic actuator 19. In general, a resistive heater is sandwiched between the two layers to controllably introduce the thermal stimulation.

Figure 6A:
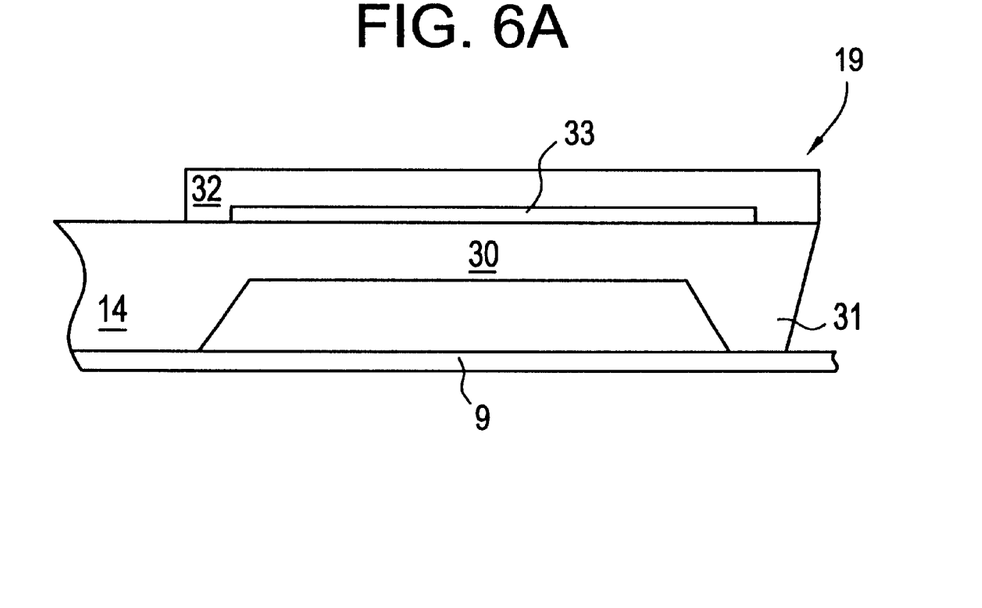
FIG. 6A is a cross section of the z-axis bimorphic microactuator used in the micro-aligner subsystem shown in FIG. 4A taken along line A–A' of FIG. 4B when the z-axis actuator is at rest.

For example, FIG. 6A shows the z-axis actuator 19 when at rest. The z-axis actuator 19 includes a diaphragm structure 30 having a distal end 31 and the diaphragm structure is formed by undercut etching a portion of the silicon substrate 14, as defined between two parallel relief channels 19' (see FIG. 4A) formed through carrier substrate 14. Distal end 31 of z-axis actuator 19 is adjacent yet spaced from sidewall 4 of alignment housing 17. The processing used to form cantilever-like structures in the surface of a silicon substrate by anisotropic wet etching is known to those skilled in the art. The bimorphic actuator 19 includes two layers of materials which have different coefficients of thermal expansion, such as a layer of nickel 32 (or copper) disposed on silicon, and the metal layer has a larger coefficient of thermal expansion than silicon. The thin film resistive heater 33 is formed on the silicon substrate 14 in the desired pattern by similar techniques as described elsewhere herein relative to resistive heaters 26 used for the in-plane microactuators 15 and 16.

In order to facilitate electrical stimulation of the bimorphic actuators, bonding pads 18 (FIG. 4A), typically comprised of a conductive material, such as gold, can be formed on opposed end portions of the bimorphic actuator 19 such that an electrical current can be established therebetween via leads 2" connected to a power supply (not shown). Then, referring again to FIG. 6A, the metallic layer 32 can be deposited on the silicon 14 and thin film heater 33 by a variety of methods, including preferential sputtering, directed evaporation, and electroplating, with departing from the spirit and scope of the present invention.

Figure 6B:
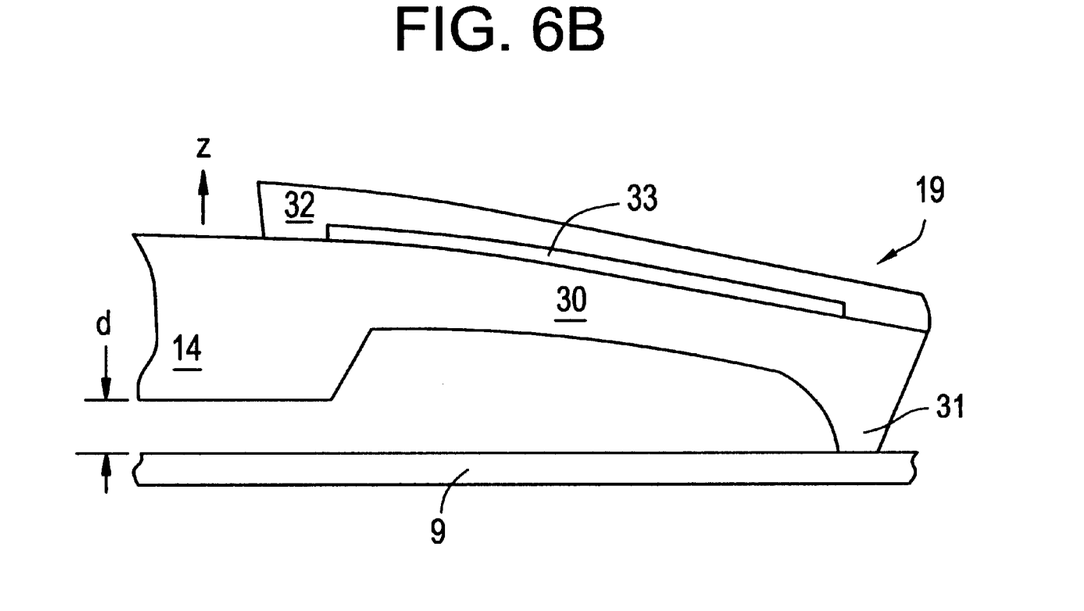
FIG. 6B is a cross section of the z-axis bimorphic microactuator used in the micro-aligner subsystem shown in FIG. 6A taken along line A–A' of FIG. 6B when the z-axis actuator is activated.

FIG. 6B is a cross section of the z-axis microactuator of z-axis actuator taken along lone A–A' of FIG. 4B when the z-axis actuator is activated by inducing thermal stimulation through resistive heater 33. Upon heating via thin film resistive heater 33, the distal end 31 of the diaphragm 30 is caused to deflect downward, which, in turn, creates a counterforce pushing upward the carrier 14 (via diaphragm 30) a displacement distance 'd' in the z-direction which effectively displaces the lens 105 positioned thereon in the z-direction. In this embodiment, the micro-aligner 10 includes current supply means for providing current to the resistive heater 33 of bimorphic actuator 19. In one embodiment, this can be accomplished by leads 2" extending to respective pins disposed within the connector housing 101, similar to that described in U.S. Pat. No. 5,606,635 in the context of a opto-electronic package, which teachings are incorporated herein by reference.

In this embodiment, the amount of the deflection of bimorphic actuator 19 is proportional to the magnitude of the electrical stimulation. By therefore controlling the current supplied to the bimorphic actuator 19, the amount of the bending or deflection and, consequently, the position of the carrier 14 relative to the base 9 can be controlled since the amount of bending is generally proportional to the current supplied to the resistive heater of the bimorphic actuator. Sufficient resistive heating can be generally provided by relatively small amounts of the current, such as 10 mA, thereby reducing the power requirements for the microstructure 19 of this embodiment.

The micro-aligner 10 having the construction described above is able to displace lens 105 greater than 10 microns in any one of the x- or y-directions and displace a lens greater than 100 μm in the z-direction, at forces of >30 mN in the x- or y-directions and at a force of >100 mN in the z-direction, and a power of <1.0 watt. The movable carrier 14 can have a square or rectangular surface geometry, as indicated in FIG. 4A, although it will be understood that the configuration of the carrier 14 is not limited thereto as long as the above functional requirements are met.

As an exemplary processing scheme for fabricating micro-aligner 10 (and micro-aligner 10'), fabrication of the micro-aligner carrier chip begins with definition of a PECVD silicon nitride layer 14" (see FIG. 4A) on a silicon wafer, to provide carrier substrate 14, which are later etched via bulk etching to form the cantilever shaped z-axis actuator 19 and the thinned substrate diaphragm regions 28 (by etching recesses into the backside of the carrier 14) at areas below the resistive heaters 26 and thermally actuated arch beam actuators 15 and 16. A low stress PECVD silicon nitride layer patterned on both sides of the silicon wafer is used for this purpose. As is known in the art, the silicon nitride layer forms a base layer which adds strength to the structure as well as a chemical barrier or etch-stop layer.

The surface micromachine layers are then patterned to form the thermal isolation structures and microheaters for the thermally actuated beam actuators 15 and 16. A thick electroplated nickel layer is patterned using the LIGA (German acronym which translates to Lithography, Plating, and Molding) technique. As known to those skilled in the art, LIGA processes are based on a combination of lithography, electroforming and molding. In fact, the acronym LIGA is derived from the German translation of lithography, electroforming and molding, namely, Lithography, Galvanoformung and Abformung. Advantageously, LIGA processes may be used to obtain relatively large height-to-width ratios which permit fabrication with precise tolerances. Thus, this step relies upon synchrotron based deep x-ray lithography.

A key aspect of LIGA patterning is the ability to define high aspect ratio structures, which is crucial for obtaining actuation in the plane of the carrier chip and for defining corresponding spring structures with high in plane compliance. LIGA also permits plating heights which are sufficiently thick to form passive fixturing guides for the fiber, precise edge reference structures, and provides convenient definition of conductor paths for actuator control input. Optical lithography ensures excellent alignment of reference structures with fiber guides and thereby provides assembly alignment accuracy within the capture range of the microactuators.

Following LIGA patterning, the movable portions of the nickel structures are released via sacrificial etching. That is, after forming the nickel structures in the surface of carrier 14 via LIGA, a chemical etch undercuts are provided to selectively release nickel structures from the carrier 14. By properly timing the etch, some nickel structures are completely undercut and, thus, released, while others remain attached to the substrate. In a preferred embodiment of the present invention, fixed structures, e.g., features 3, 3', 18, 21, and 22 in FIG. 4A, remain attached to substrate 14 while other structures such as arches 23 and beams 25, 25' of in-plane microactuators 15 and 16 are released by undercut etching. This result can also be accomplished by using a masked sacrificial layer.

The bulk silicon wafer of substrate 14 is then subjected to anisotropic etching to cut away portions of the substrate 14 located below diaphragm area 28 (FIG. 5) and thermally relieve the polysilicon heaters 26, using the silicon nitride layer as an etch stop. According to the invention, etching performed on the bottom side of substrate 14 stops at nitride layer 14" which forms the diaphragm 28 on the top surface of substrate 14. Advantageously, this arrangement thermally isolates heater 26 from the other components of micro-aligner 10 and the alignment housing 17. For example, by thermally isolating lens 105 from heater 26, lens 105 may be maintained at a desired temperature to prevent temperature fluctuation from altering or otherwise affecting its alignment. In addition to providing thermal isolation, the etching causes a greater percentage of the heat provided by heater 26 to be transferred to actuator 15 or 16. As a result, actuators 15 and 16 have improved deflection response and efficiency. The resulting process merges surface and bulk silicon micromachining with nickel surface micromachining via the LIGA technique.

The most real estate taken up by the anisotropic bulk micromachining is attributable to making the heaters and relief of the z-actuator. These area requirements can be eliminated by using reactive ion etching (RIE) of the silicon which can achieve through wafer etching with aspect ratios of 40:1. The micro-aligner 10 can require on the order of 1 mm$^2$ of real estate, meaning thousands of micro-aligners such as described herein can be formed per wafer surface.

Following wafer level fabrication, the individual micro-aligner devices are separated from each other using conventional dicing, and then they can be packaged as described herein.

As shown in FIG. 1, one or more pairings of micro-aligners 10 and 10', supporting corresponding pairings of lenses 105 and 106, can be disposed within the fiber optic connector 101 to permit concurrent optical coupling of a plurality of input optical fibers with a plurality of output fibers, such as could useful or needed in the context of two spliced composite structural parts having embedded fiber optics. The micro-aligners 10 can precisely simultaneously provide aligned coupling of multiple input and output optical fiber pairings from two composite parts with respective lens elements of the fiber optic connector in order to collimate the optical signals transmitted therethrough.

A fiber optic connector configuration as described in detail above was constructed and analyzed optically in order to determine the range of adjustment that might be expected at the device level, for an initial fiber alignment mismatch of up to 0.2 mm. The general layout of the equipment used in the tests is shown in FIGS. 1 and 2. The microaligners used to support and microposition respective GRIN lenses within a fiber optic connector housing were fabricated in the manner described above to a size of approximately 5×4×1 mm³. The GRIN lenses were modeled using a quadratic index gradient calculated according to the manufacturer's specifications, which was determined as follows:

$$N(r) = N_0 \cdot \left(1 - \frac{A}{2} r^2\right)$$

For the models investigated, A=−0.231, $N_o$=1.591, and the GRIN lenses each had a 6.042305 mm thickness (length) and the two lenses were separated by an intervening air gap of 1.000000 mm. The input fiber was assumed centered, with a numerical aperture of 0.16. The output fiber was offset from the input fiber in the meridional plane in steps of 0.02 mm up to 0.2 mm, and, after each displacement step, the second GRIN lens (106, in FIG. 2) was adjusted in position using its associated microaligner (10') to correct for the offset (i.e., the initial mismatch alignments). To accomplish this, both were displaced in the same direction by the same amount until the reference ray was within 0.0001 mm of the fiber position in the image plane (114). At each re-aligned position, the fiber coupling was re-computed. The analysis in this regard was done using conventional software available for this purpose, viz., Sinclair Optics' OSLO Pro 5.2 optical analysis program. Coupling, referred to herein as a fiber coupling factor, is calculated in this program by computing a normalized overlap integral between the diffraction amplitude, U(x',y') function in the image plane and the fiber mode pattern, ψ(x',y'), in this case a step index function as defined below:

$$\frac{\text{coupling}}{\text{Factor}} = \frac{\iint U(x', y')\psi*(x', y')dx'dx'}{\sqrt{\iint U(x', y')U*(x', y')dx'dy' \iint \psi(x', y')\psi*(x', y')dx'dy'}}$$

Figure 7:
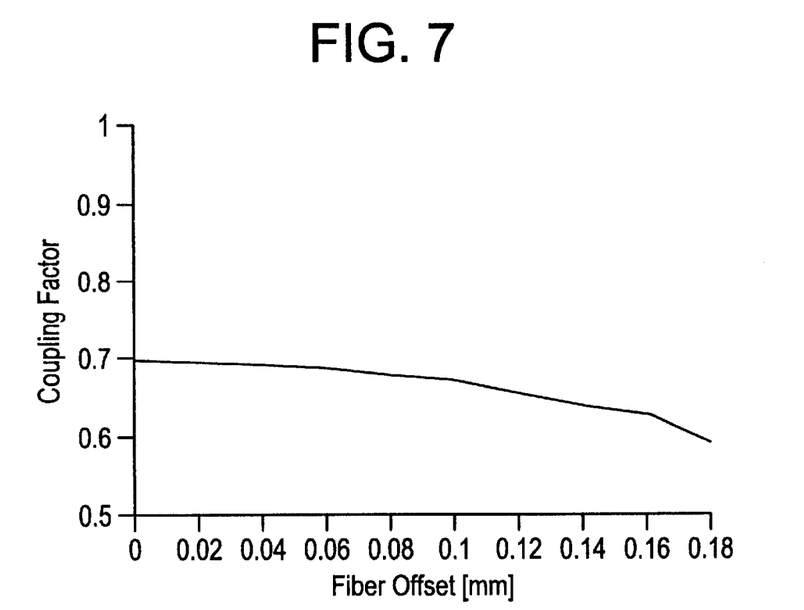
FIG. 7 is a graphical representation showing the coupling efficiency of a fiber optic connector according to FIG. 1 with the coupling factor value achieved plotted as a function of the amount of initial fiber offset.

The fiber core index was set to 1.55, cladding index to 1.45, and the core diameter to 6.6 microns (i.e., single mode at 1.3 micron wavelength). After analyzing the coupling factor after each displacement step in the manner indicated above, the results were recorded and they are plotted in FIG. 7. The data results shown in FIG. 7 show that a very small loss of fiber coupling occurred as a function of increasing fiber alignment mismatches corrected by the inventive device. The optical analyses using the fiber optic connector made according to this invention also revealed that the amount of fiber offset error between the two optical fibers to be optically coupled could be corrected with the same amount lens motion, which indicates a high coupling efficiency was attained with the inventive fiber optic connector system.

In view of the above, it will be, seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

For example, it will be appreciated that the fiber optic connector of this invention can employ any three-axis micro-aligners meeting the performance and physical requirements outlined herein, and the micro-aligners are not limited to only those exemplified herein with reference to FIGS. 4A, 4B, 5 and 6. For example, the three-axis micro-actuators described in U.S. Pat. No. 5,602,955, which teachings are incorporated herein by reference, alternatively could be employed as the micro-aligner (feature 10 or 10' in FIG. 1) used to align the lens elements with the optical fibers according to this invention. Additionally, in one optional further embodiment, the fiber optic connector additionally can incorporate a second pair of micro-aligners contained within and attached to the housing, wherein each micro-aligner of the second pair acts against a second side of one of the lenses from a direction that is normal to the first side acted upon by a micro-aligner of the first pair. Each micro-aligner of the second pair of micro-aligners induces movement to the associated lens in a second set of three orthogonal directions that are opposite in direction to the respective three orthogonal directions of the first set, to further controllably position each lens element relative to a respective optical fiber.

What is claimed is:

1. A fiber optic connector, comprising:

a connector housing having a base side, first and second sidewalls upstanding from the base side that are spaced apart in relation to each other, and said first sidewall defining at least one aperture through which optical signals can be transmitted by an input optical fiber located outside the housing and said second sidewall defining at least one aperture through which optical signals can be transmitted to an output optical fiber located outside the housing, where the optical fibers are fixed in position in relation to the housing;

a pair of optical lens elements contained within the housing and alignable about a common longitudinal axis which collimate optical signals transmitted between the respective input and output optical fibers, and the lens elements have inner end portions facing each other in spaced apart relation and outer end portions facing a respective end of one of the optical fibers, and where the lens elements being positionable in three orthogonal directions relative to either one of the optical fibers; and a pair of micro-aligners contained within the housing and attached to the housing, wherein each micro-aligner holds one of the lens elements, and each micro-aligner induces movement to the associated lens element in a set of three orthogonal directions to controllably position each lens element relative to a respective optical fiber; and wherein each said micro-aligner comprises:

a stationary alignment housing comprising a base and four housing sidewalls upstanding from said base defining a rectangular-shaped recess;

a carrier having a surface plane and holding the lens element to be positioned in alignment with the respective optical fiber, and where said carrier is positioned within said recess defined by the stationary alignment housing;

first and second microactuators provided on the carrier for effecting in-plane alignment of the lens element with the respective optical fiber in either or both of the two orthogonal in-plane directions in which said in-plane microactuators, when either is activated, exerts a force on a housing sidewall of said alignment housing sufficient to overcome the normal and opposite biasing force created by first and second respective associated biasing means included on said carrier to cause movement of the carrier in one of the in-plane directions, where said first and second biasing means are provided on opposite sides of said carrier relative to said first and second in-plane microactuators, respectively, with each said biasing means biased against the stationary alignment housing to thereby impose opposing counter forces against which the respective first and second in-plane microactuators on the carrier must act and overcome to cause said in-plane movement of said carrier, and further including first and second backstons located on the carrier in respective association with each of the first and second microactuators, delimiting the amount of return in-plane movement of the associated first or second microactuator after either of the respective first or second microactuator is de-activated; and a third microactuator provided on the carrier which, when activated, effectively deflects the carrier, and thus the lens element, upward in a direction away from the base.

2. The system of claim 1, wherein the carrier includes a lens element holding means selected from the group consisting of an optic groove and a LIGA channel, for receiving the lens element and for maintaining the lens element in a fixed relation to the carrier.

3. The fiber optic connector of claim 1, wherein said lens element is a graded index lens element.

4. The fiber optic connector of claim 1, further comprising:

said connector housing defining a plurality of apertures in each sidewall through which optical signals can be transmitted by input optical fibers through a first sidewall of the housing and to output optical fibers located in fixed positions outside the opposite sidewall of the housing;

a plurality of pairings of lens elements disposed co-linearly within the housing with each pairing of lens elements disposed between two opposing apertures in the sidewalls for optical coupling of optical fibers fixed outside the apertures; and a plurality of micro-aligners for precisely aligning the lens elements with respective optical fibers, wherein each micro-aligner holds one of the lenses, and each micro-aligner induces movement to the associated lens in three orthogonal directions to controllably position each lens element relative to a respective optical fiber.

5. The fiber optic connector of claim 1, wherein said third microactuator has a first layer of a first material superposed in contact on a second material where said first and second layers respond differently to electrical stimuli so that the third microactuator is deflected in a third direction orthogonal to the two in-plane directions by the electrical stimuli and operably urged against a portion of the carrier thereby moving the carrier in the third direction.

6. The fiber optic connector of claim 1, wherein the carrier includes an LIGA channel or defined groove therein for receiving the lens element and for maintaining the lens element in a fixed relation to the carrier.

7. The fiber optic connector of claim 1, wherein the connector housing comprises a hermetically sealed connector housing.

8. A method of fabricating a fiber optic connector, comprising the steps of:

providing a connector housing having a base side, a pair of sidewalls upstanding from the base side that are spaced apart in relation to each other, and each said sidewall defining at least one aperture;

disposing a pair of optical lens elements within the housing, and the lens elements have inner end portions facing each other in spaced apart relation;

disposing a pair of micro-aligners within the housing and attached to the housing, wherein each micro-aligner holds one of the lens elements, and each micro-aligner induces movement to the associated lens element in three orthogonal directions, and wherein each said micro-aligner comprises:

(i) a stationary alignment housing comprising a base and four housing sidewalls upstanding from said base defining a rectangular-shaped recess;

(ii) a carrier having a surface plane and holding the lens element to be positioned in alignment with the associated optical fiber, and where said carrier is positioned within said recess defined by the stationary alignment housing;

(iii) first and second microactuators provided on the carrier for effecting in-plane alignment of the lens element with the associated optical fiber in either or both of the two orthogonal in-plane directions in which said in-plane microactuators, when either is activated, exerts a force on a housing sidewall of said alignment housing sufficient to overcome the normal and opposite biasing force created by first and second respective associated biasing means included on said carrier to cause movement of the carrier in one of the in-plane directions, where said first and second biasing means are provided on opposite sides of said carrier relative to said first and second in-plane microactuators, respectively, with each said biasing means biased against the stationary alignment housing to thereby impose opposing counter forces against which the respective first and second in-plane microactuators on the carrier must act and overcome to cause said in-plane movement of said carrier, and further including first and second backstops located on the carrier in respective association with each of the first and second microactuators, delimiting the amount of return in-plane movement of the associated first or second microactuator after either of the respective first or second microactuator is de-activated; and (iv) a third microactuator provided on the carrier which, when activated, effectively deflects the carrier upward in a direction away from the base;

positioning an input optical fiber adjacent one aperture and an output optical fiber adjacent another aperture in the opposite sidewall of the housing such that outer end portions of the lens elements face a respective end of one of the optical fibers;

fixing the optical fibers in position in relation to the housing;

controllably positioning each of the lens elements in three orthogonal directions relative to one of the input and output optical fibers such that optical signals transmitted by the aligned optical fibers can be effectively collimated by the lens elements for efficient coupling between the optical fibers.

9. The method of claim 8, wherein said positioning step comprises positioning the lens element held on the carrier relative to the optical fiber by actuating one or more of the first, second, and third microactuators, and precisely aligning the lens element with the optical fiber.

* * * * *